J. N. CAIN.
COTTON CHOPPER.
APPLICATION FILED OCT. 11, 1911.
1,029,587.
Patented June 18, 1912.
2 SHEETS—SHEET 1.
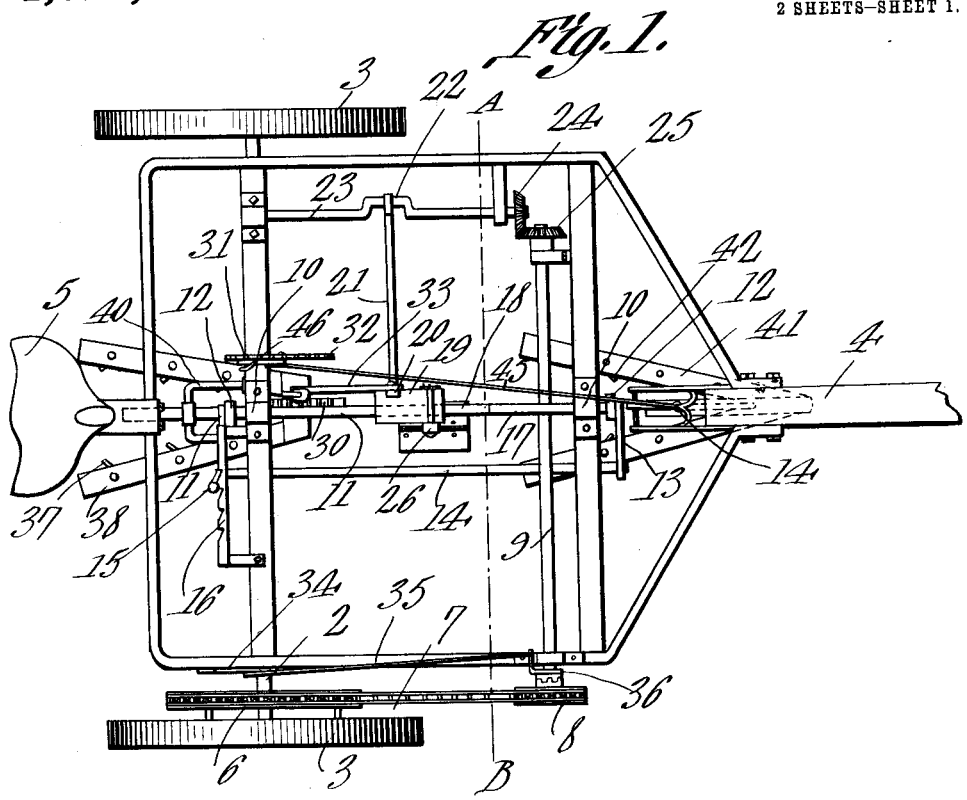
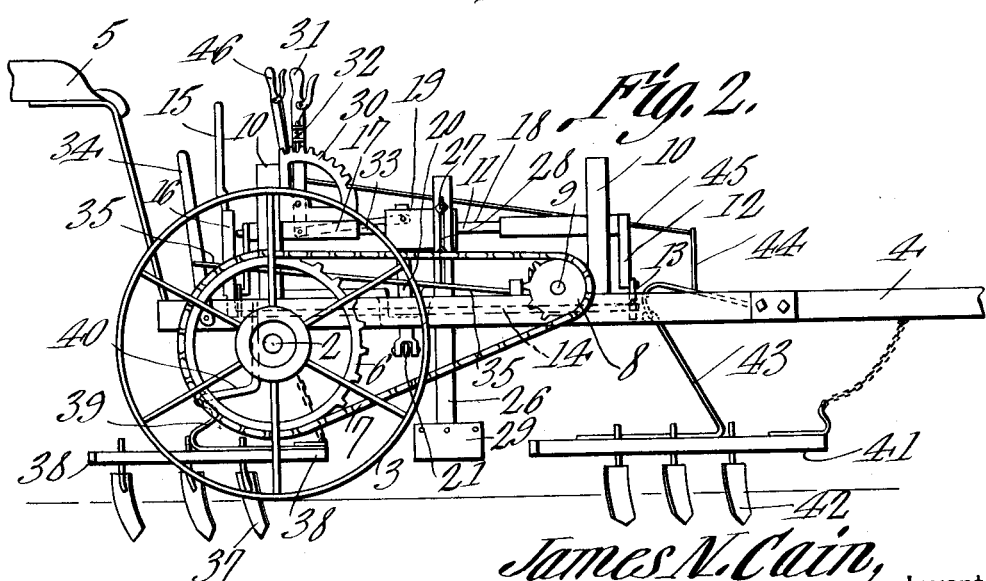

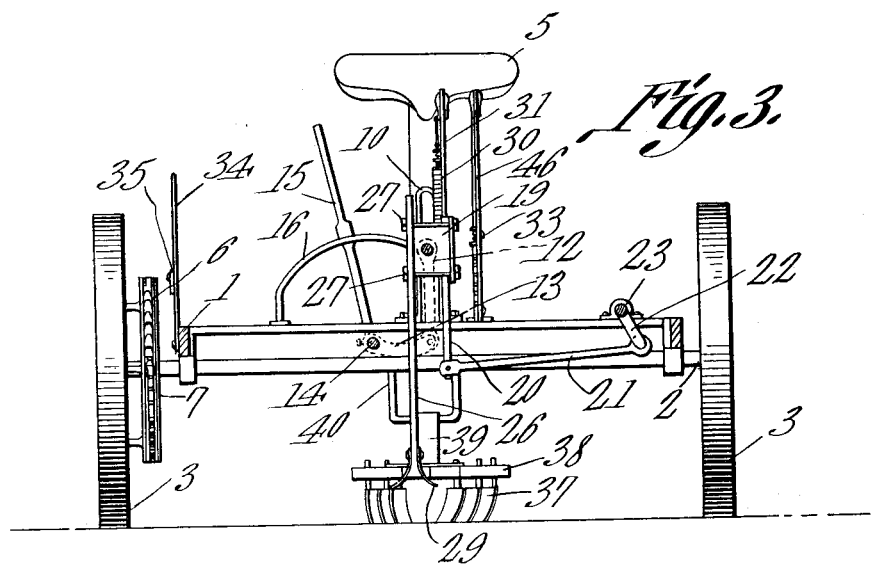
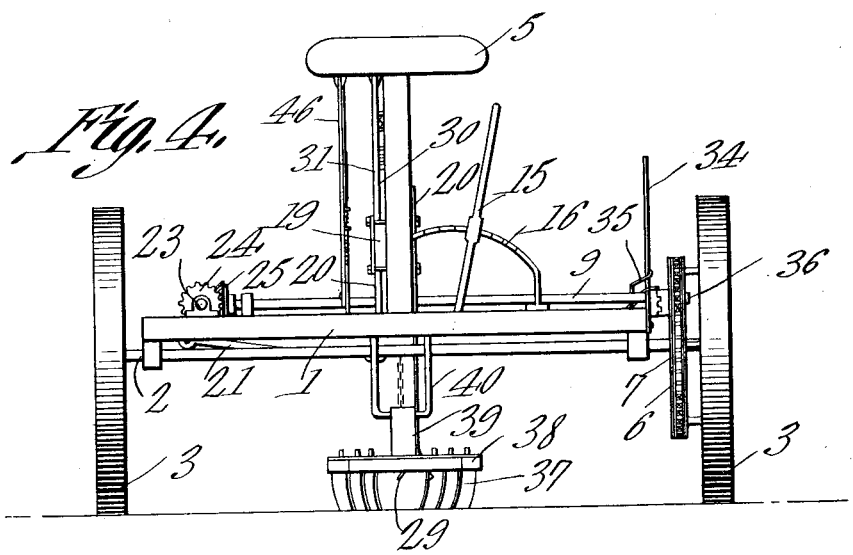

UNITED STATES PATENT OFFICE.

JAMES N. CAIN, OF HAWLEY, TEXAS.

COTTON-CHOPPER.

1,029,587.  Specification of Letters Patent.  Patented June 18, 1912.

Application filed October 11, 1911. Serial No. 653,996.

*To all whom it may concern:*

Be it known that I, JAMES N. CAIN, a citizen of the United States, residing at Hawley, in the county of Jones and State of Texas, have invented a new and useful Cotton-Chopper, of which the following is a specification.

This invention relates to a combined cotton chopper and cultivator, one of the objects of the invention being to provide a machine of this type having a double edged cutter mounted for oscillation, means being employed whereby the said cutter or chopper can be quickly raised or lowered to any desired elevation, there being additional means for shifting the chopper longitudinally of the machine so as to miss one or more plants.

A further object is to provide a novel arrangement of cultivators for use in connection with the chopper.

With the foregoing and other objects in view which will appear as the description proceeds, the invention resides in the combination and arrangement of parts, and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of the machine. Fig. 2 is a side elevation thereof. Fig. 3 is a section on line A—B Fig. 1. Fig. 4 is a rear elevation of the machine.

Referring to the figures by characters of reference 1 designates a frame mounted upon an axle 2 carried by wheels 3, there being a draft tongue 4 extending from the front end of the frame and a driver's seat 5 supported upon the rear portion of said frame. A drive sprocket 6 is connected to one of the wheels 3 and motion is transmitted therefrom through a chain 7 to a sprocket 8 secured to one end of a shaft 9 which is journaled upon and extends transversely of the front portion of the frame. Longitudinally slotted guide standards 10 are mounted upon the front and rear portions of the frame and a guide bar 11 is mounted to slide upwardly and downwardly within these standards, each end of the bar being engaged by a link 12. These links are pivotally connected to crank arms 13 formed at the ends of a rock shaft 14. This rock shaft extends longitudinally within and is journaled upon the frame and a lever 15 extends upwardly from the rear end of the said shaft 14 and engages a toothed segment 16 whereby the said shaft 14 may be held in any position to which it is adjusted. It will be apparent that by swinging the lever 15 in one direction, the arms 13 can be caused to elevate the links 12 and the rod 11 and, by swinging lever 15 in the opposite direction, the said rods 11 can be lowered within the standards 10. The rod 11 is preferably formed with angular end portions, as indicated at 17, said portions being located within the standards 10. The intermediate portion of the rod is rounded, however, as shown at 18 and constitutes the bearing of a block 19. This block has a depending arm 20 connected, at its lower end, to a pitman 21 extending from the crank 22 of a shaft 23. This shaft extends longitudinally of the machine at one side of the frame and has a gear 24 at its front end receiving motion from a gear 25 secured to the shaft 9 hereinbefore referred to.

A shank 26 is adjustably connected to one side of the block 19 by means of bolts 27 extending through a longitudinal slot 28 within the shank, and connected to the lower end of the shank are oppositely curved chopping blades 29, as clearly indicated in Fig. 3.

A toothed segment 30 is secured upon one end portion of the guide bar 11 and a lever 31 is fulcrumed upon this segment and carries a pawl 32 adapted to engage the segment so as to hold the lever against movement relative thereto. A link 33 connects one end of the lever to the block 19, the connection between the link and block being loose so that said block is free to rock upon the rounded portion 18 of the bar 11 without breaking the connection between the link and the block. It will be apparent that by shifting lever 31, block 19 can be moved forwardly or rearwardly along the rounded portion 18 of the bar 11. It is to be understood that the connections between the pitman 21 and the crank 22 and block 19 are such as to permit this longitudinal movement of the block 19 without interfering with the proper oscillation of the block and reciprocation of the pitman.

A lever 34 may be mounted upon one side portion of the frame 1, this lever operating a rod 35 which, in turn, operates a clutch 36 whereby the sprocket 8 can be brought into or out of operative relation with the shaft 9.

When the machine is drawn forward motion will be transmitted from the sprocket 6 to sprocket 8 and, if the clutch 36 is properly positioned, the shaft 9 will be rotated thus transmitting motion through the gears 25 and 24 to shaft 23. Crank 22 will actuate the pitman 21 and the arm 20 and shank 26 will thus be oscillated. As the blades 29 are curved in opposite directions, it will be seen that these blades will successively cut away the plants during the oscillation of the shank. Should it be desired to lift the chopping blades so as to avoid an unyielding obstruction, the lever 15 is shifted so as to swing arms 13 upwardly. Links 12 will therefore raise the bar 11 and the parts connected thereto. The chopping blades can be quickly lowered by reversing the foregoing operation. Should it be desired to skip one or more plants during the oscillation of the chopping blades, block 19 can be pushed forwardly or backwardly by means of lever 31 in the manner hereinbefore described.

As hereinbefore stated the chopping blades can be used in connection with a cultivator. A series of cultivator teeth can be located either or both in front and in rear of the chopping blades. The blades 37 of the cultivator are connected to a V-shaped frame 38 which, in turn, has a spring 39 projecting upwardly therefrom and attached to a bracket 40 extending rearwardly from the frame. This spring 39 serves to press the blades 37 into the soil. Another similar frame 41 carrying blades 42, may be arranged under the front portion of the frame 1, said frame 41 being connected to a pivotally supported angular arm 43 having an upstanding finger 44 to which an operating rod 45 is attached. This rod is connected to a lever 46 by means of which the front cultivator can be raised or lowered out of engagement with the soil. As before stated both of the cultivators can be employed in connection with the cotton chopper or, if desired, either one of them can be used in connection therewith.

What is claimed is:—

1. A cotton chopper including a wheel supported frame, upstanding guides thereon, a member slidably mounted within the guides, means for raising and lowering the member within the guides, a chopping blade mounted for oscillation and suspended from said member, and means for shifting the blade longitudinally of the member.

2. In a cotton chopper a wheel supported frame, upstanding guides, a member slidably mounted within the guides, means for raising and lowering the member, a chopping blade mounted for oscillation and suspended from said member, means for adjusting the blade toward or away from the said member, and means for shifting the blade longitudinally of the member.

3. A cotton chopper including a wheel supported frame, upstanding guides thereon, a member mounted to slide within the guides, a block mounted to slide and rotate upon said member, a shank adjustably connected to and depending from the block, opposed chopping blades upon the shank, means operated by one of the supporting wheels for oscillating the block and shank, and means under the control of the driver for shifting the block longitudinally of the member during the oscillation of the shank.

4. A cotton chopper including a wheel supported frame, upstanding guides, a member slidably mounted within the guides, a chopping blade connected to and supported below said member, means for oscillating the blade, a shaft, arms extending therefrom, link connections between the arms and the end portions of the member, means for actuating said shaft to raise or lower said member, an actuating lever movable with said member, and means operated by said lever for shifting the blade longitudinally of the member in either direction.

5. A cotton chopper including a wheel supported frame, upstanding guides, a member mounted to slide upwardly and downwardly within the guides, a block mounted for rotation upon said member, a chopping blade connected to and movable with the block, means operated by one of the supporting wheels for oscillating the blade, a lever supported by said member, and means actuated by the lever for shifting the block longitudinally of the member during the oscillation of the blade.

In testimony that I claim the foregoing as my own, I have hereto affixed my signature in the presence of two witnesses.

JAMES N. CAIN.

Witnesses:
ROBERT K. SMITH,
THOMAS H. BATES.

---

Copies of this patent may be obtained for five cents each, by addressing the "Commissioner of Patents, Washington, D. C."